US012632350B1

(12) United States Patent
Fu et al.

(10) Patent No.: US 12,632,350 B1
(45) Date of Patent: May 19, 2026

(54) FAILOVER FOR CLOUD-NATIVE APPLICATIONS

(71) Applicant: Zoom Communications, Inc., San Jose, CA (US)

(72) Inventors: Xiaolin Fu, Los Gatos, CA (US); Daofu Huang, Hefei (CN); Xiaohuan Pan, Hangzhou (CN); Guobing Sang, Los Gatos, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/420,350

(22) Filed: Jan. 23, 2024

(51) Int. Cl.
*G06F 11/20* (2006.01)

(52) U.S. Cl.
CPC .... *G06F 11/2025* (2013.01); *G06F 2201/865* (2013.01)

(58) Field of Classification Search
CPC ........... G06F 11/3457; G06F 11/26–27; G06F 11/079–0796; G06F 11/202–2051
See application file for complete search history.

(56) References Cited

U.S. PATENT DOCUMENTS

| | | | | |
|---|---|---|---|---|
| 5,812,780 | A * | 9/1998 | Chen | G06F 11/3414 714/E11.193 |
| 7,962,797 | B2 * | 6/2011 | Goldszmidt | G06F 11/079 714/39 |
| 8,018,860 | B1 | 9/2011 | Cook | |
| 8,661,287 | B2 | 2/2014 | Spear | |
| 8,751,640 | B2 | 6/2014 | Yan et al. | |
| 9,021,304 | B2 * | 4/2015 | Tonouchi | G06F 11/079 714/25 |
| 9,760,425 | B2 * | 9/2017 | Supplisson | G06F 11/0751 |
| 9,860,368 | B2 * | 1/2018 | Aggarwal | H04L 43/50 |
| 10,061,664 | B2 | 8/2018 | Verkaik et al. | |
| 10,230,662 | B2 * | 3/2019 | Li | H04L 43/0817 |
| 10,558,541 | B1 * | 2/2020 | Chakkassery Vidyadharan | G06F 11/3006 |
| 10,592,359 | B2 * | 3/2020 | Sankarasubramanian | G06F 11/0709 |
| 10,705,928 | B2 | 7/2020 | Mortimore, Jr. et al. | |
| 10,911,789 | B2 | 2/2021 | Yang et al. | |
| 11,321,198 | B2 | 5/2022 | Chilamakuri et al. | |
| 2004/0158766 | A1 * | 8/2004 | Liccione | H04L 41/046 714/4.11 |
| 2015/0212913 | A1 | 7/2015 | Anumalasetty et al. | |
| 2017/0031741 | A1 * | 2/2017 | Seigel | G06F 11/0709 |
| 2017/0357917 | A1 | 12/2017 | Holmes et al. | |
| 2020/0319982 | A1 | 10/2020 | Rusev et al. | |

(Continued)

FOREIGN PATENT DOCUMENTS

CN            106716972 B      12/2020

*Primary Examiner* — Michael Maskulinski
(74) *Attorney, Agent, or Firm* — Young Basile Hanlon & MacFarlane, P.C.

(57) ABSTRACT

A system and method for failover for cloud-native applications, such as cloud-native video-conferencing services, that includes a software agent that monitors the health of services executing on servers. An agent monitors predefined metrics of a service and sends alerts to a plan-execution system when a monitored metric fails to satisfy a predefined condition. The plan-execution system applies predefined rules to received alerts to determine whether a service is failing. The plan-execution system instructs a command center to redirect client requests for a failing service to a failover service.

20 Claims, 7 Drawing Sheets

(56) References Cited

U.S. PATENT DOCUMENTS

| | | |
|---|---|---|
| 2023/0236940 A1 | 7/2023 | Zakharkin et al. |
| 2024/0143666 A1 * | 5/2024 | Grushka ............... G06F 16/907 |

* cited by examiner

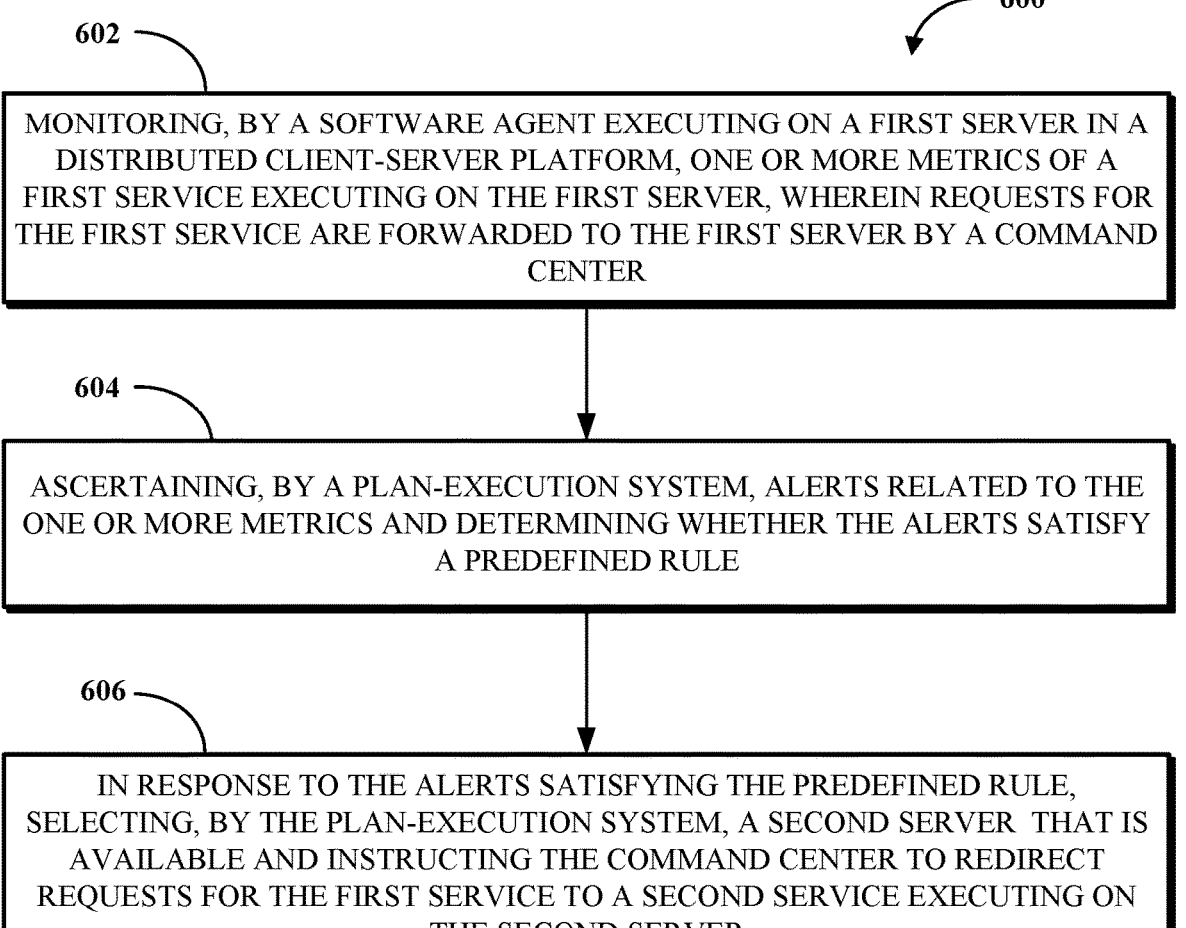

600

602

MONITORING, BY A SOFTWARE AGENT EXECUTING ON A FIRST SERVER IN A DISTRIBUTED CLIENT-SERVER PLATFORM, ONE OR MORE METRICS OF A FIRST SERVICE EXECUTING ON THE FIRST SERVER, WHEREIN REQUESTS FOR THE FIRST SERVICE ARE FORWARDED TO THE FIRST SERVER BY A COMMAND CENTER

604

ASCERTAINING, BY A PLAN-EXECUTION SYSTEM, ALERTS RELATED TO THE ONE OR MORE METRICS AND DETERMINING WHETHER THE ALERTS SATISFY A PREDEFINED RULE

606

IN RESPONSE TO THE ALERTS SATISFYING THE PREDEFINED RULE, SELECTING, BY THE PLAN-EXECUTION SYSTEM, A SECOND SERVER THAT IS AVAILABLE AND INSTRUCTING THE COMMAND CENTER TO REDIRECT REQUESTS FOR THE FIRST SERVICE TO A SECOND SERVICE EXECUTING ON THE SECOND SERVER

FIG. 6

FAILOVER FOR CLOUD-NATIVE APPLICATIONS

FIELD

This disclosure generally relates to failover for cloud-native applications, and more specifically, to failover for cloud-native video-conferencing services.

BRIEF DESCRIPTION OF THE DRAWINGS

This disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 6 is a flowchart of an example of a technique for failover for cloud-native applications.

DETAILED DESCRIPTION

Figure 1:
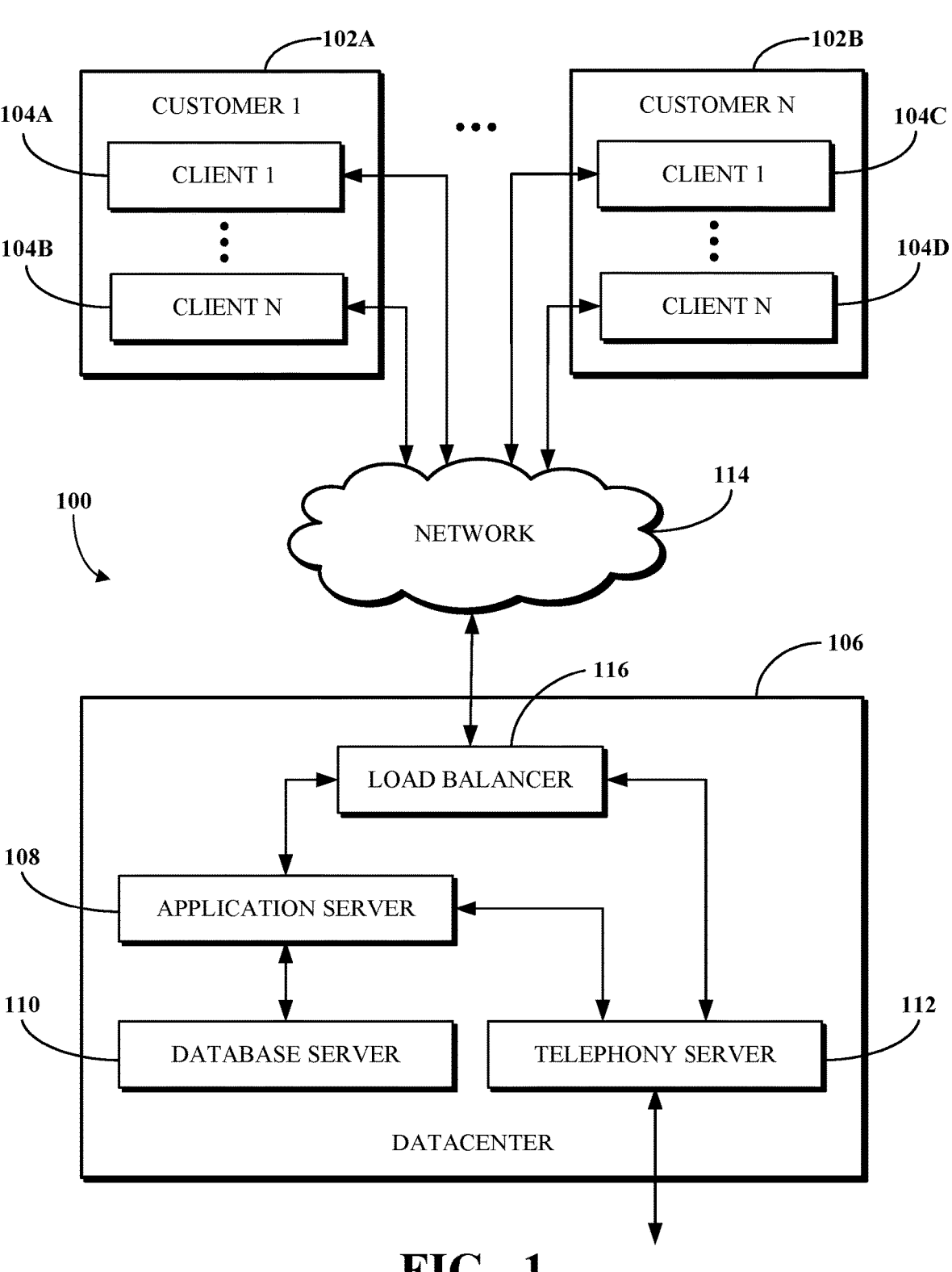
FIG. 1 is a block diagram of an example of an electronic computing and communications system.

Conferencing software is frequently used across various industries to support video-enabled conferences between participants in multiple locations. Conferencing software may be available as a standalone software product or it may be integrated within a software platform, such as a unified communications as a service (UCaaS) platform. A UCaaS platform may implement many services, such as user authentication, user chat, video recording, and so on.

UCaaS services may be executed on computing devices, e.g., servers, that are physically located in various regions for convenient access by video participants, e.g., by client devices. This may be referred to as a distributed client-server system, where client requests and server responses are collectively called traffic. However, servers may occasionally experience hardware or software failures, such that failing servers may be unable to provide services (e.g., responses) to client requests. Failover is a process of switching traffic from a failing server to a non-failing server.

Conventionally, failover is manually executed through a command center where technicians can monitor services and/or computing devices and take action if they observe unexpected behaviors. This manual approach can have limitations that include inefficient communication among technicians and decision-makers, imperfect human judgment and human detection of failures, slow execution of failover strategies, and inconsistent verification of results. Further, conventional failover is performed at the server level, not the service level. Implementations of the disclosed technology address several of the aforementioned limitations of failover.

First, instead of relying on manual failure detection, failures are detected automatically by one or more health-monitoring software agents that execute on one or more servers to monitor the health of one or more services provided by the servers. In some implementations, health monitoring comprises a health-monitoring software agent measuring one or more predefined metrics on live client traffic, for example, measuring a quantity of unsuccessful client-authentication requests. If the measurement exceeds a predefined threshold, then the service is determined to be failing and the agent sends an alarm message (which may sometimes be referred to as an alarm, an alert message or alert, a warning message or warning, an error message or error, and so on). As another example, the agent may determine that a service may be failing when it no longer receives heartbeat messages from the service as expected.

Next, a plan-execution system is responsible for processing the alarm messages from the health-monitoring agents, e.g., alarm messages indicating service errors or indicating missing heartbeat messages. The plan-execution system applies the alarms to predefined rules, and when a rule is satisfied, the plan-execution system selects a new predefined client-server configuration. But unlike conventional failover methods, where a new configuration would redirect traffic for all services of a failing server to a new server, a new configuration in the disclosed technology may redirect only traffic for the failing service. In other words, traffic for the failing service on a first server may be redirected to a second server while traffic for other services on the first server remains.

In some implementations, the failover may be automatically tested to verify whether the failover was successful. Testing may comprise generating simulated live traffic, e.g., requests from simulated clients, to the failing service to verify that such requests are redirected to and handled by the new (equivalent) service on the new server according to the new configuration.

To describe some implementations in greater detail, reference is first made to examples of hardware and software structures used to implement a system for failover for cloud-native applications. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as those of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated with or communicate with a customer network or domain for the customer 102A, and the clients 104C through 104D can be associated with or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include one or more customers and/or clients, and it can include a configuration of customers or clients different from that generally illustrated in FIG. 1. For example, and without limitation, the system 100 can include hundreds or thousands of customers, and at least some of the customers can include or be associated with one or more clients.

The system 100 includes a datacenter 106, which may include one or more servers. The datacenter 106 can represent a geographic location, which can include a facility, where the one or more servers are located. The system 100 can include one or more datacenters and servers, and it can include a configuration of datacenters and servers different from that generally illustrated in FIG. 1. For example, and without limitation, the system 100 can include tens of datacenters, and at least some of the datacenters can include hundreds or thousands of servers. In some implementations, the datacenter 106 can be associated with or communicate with one or more datacenter networks or domains, which can include domains other than the customer domains for the customers 102A through 102B.

The datacenter 106 includes servers used for implementing software services of a UCaaS platform. The datacenter 106, as generally illustrated, includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable quantity of each of the servers 108 through 112 can be implemented at the datacenter 106. The UCaaS platform can use a multi-tenant architecture in which installations or instantiations of the servers 108 through 112 are shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed to deliver software services to a client, such as one of the clients 104A through 104D, as part of a software application. The application node can be implemented using processing threads, virtual machine instantiations, or other computing features of the application server 108. In some such implementations, the application server 108 can include a suitable quantity of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired (e.g., electrical or optical), wireless (e.g., electromagnetic, optical), use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
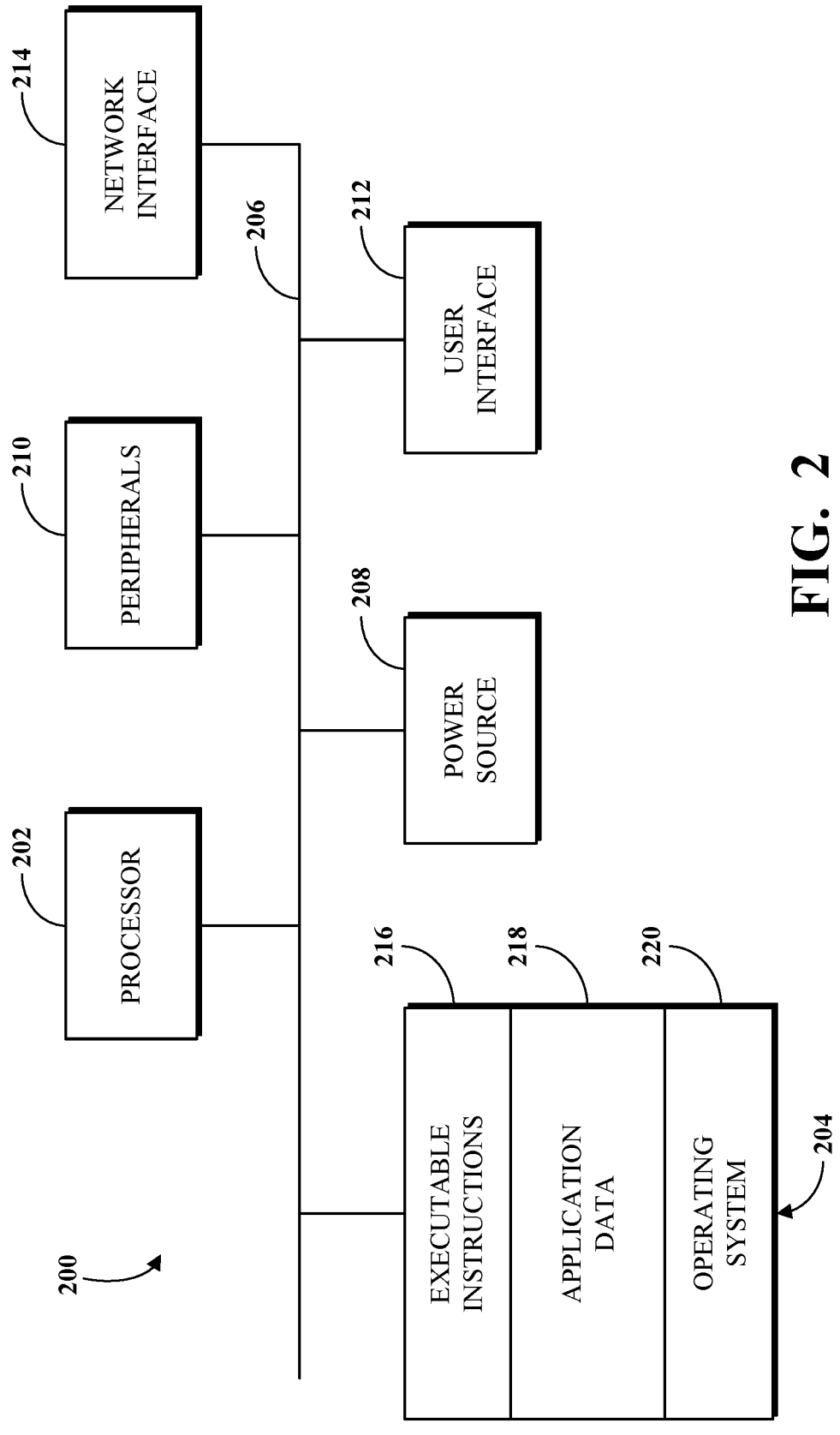
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
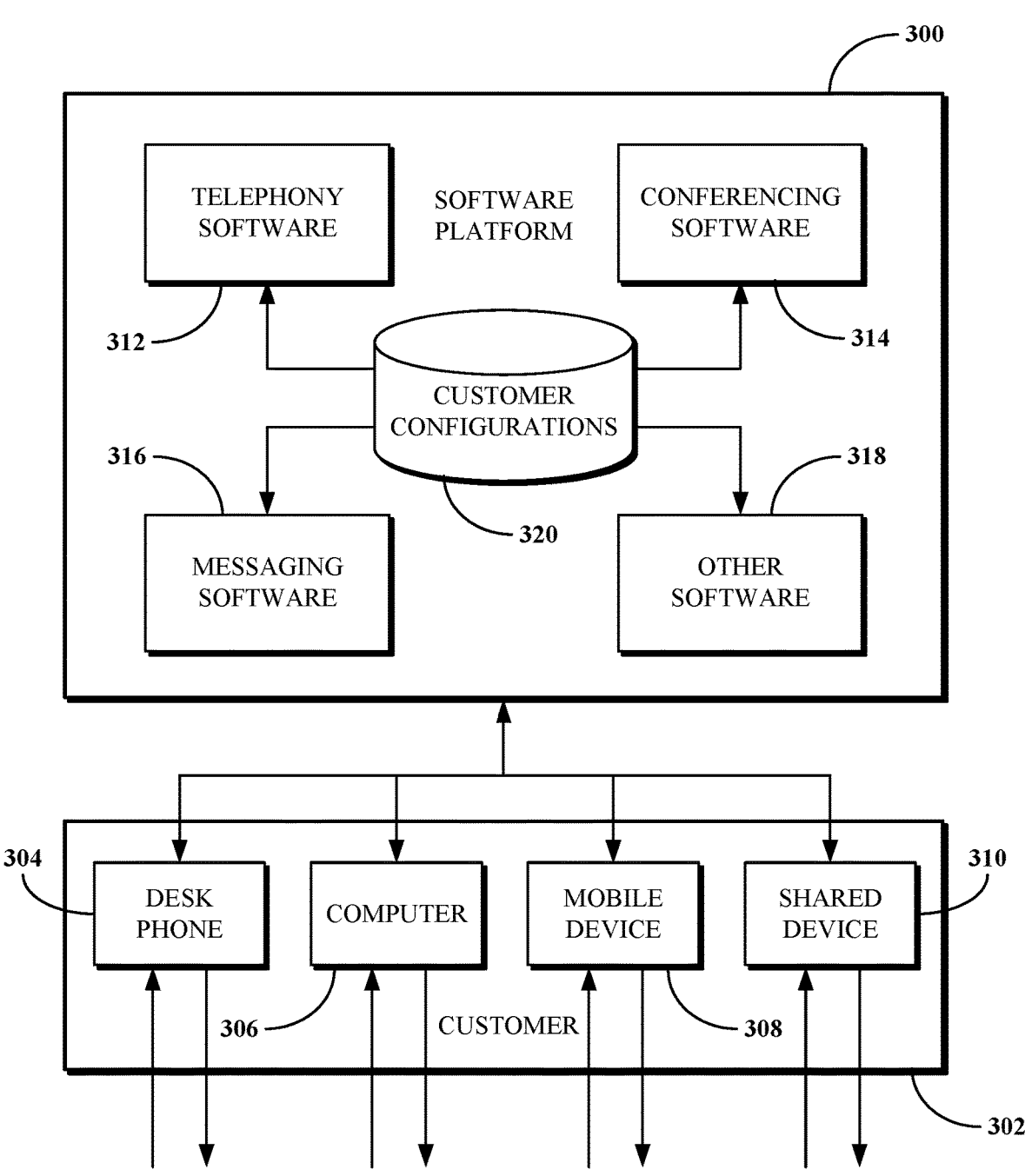
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients: a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which case the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include one or more health-monitoring agents that monitor a health of one or more services provided by a server, for example, by measuring a quantity of unsuccessful client requests to a service. If a measurement exceeds a predefined threshold, then the other software 318 may determine the service to be failing and the other software may generate an error message.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software

316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310. Terms "run" and "execute" as used herein with reference to software may be synonymous.

Figure 4:
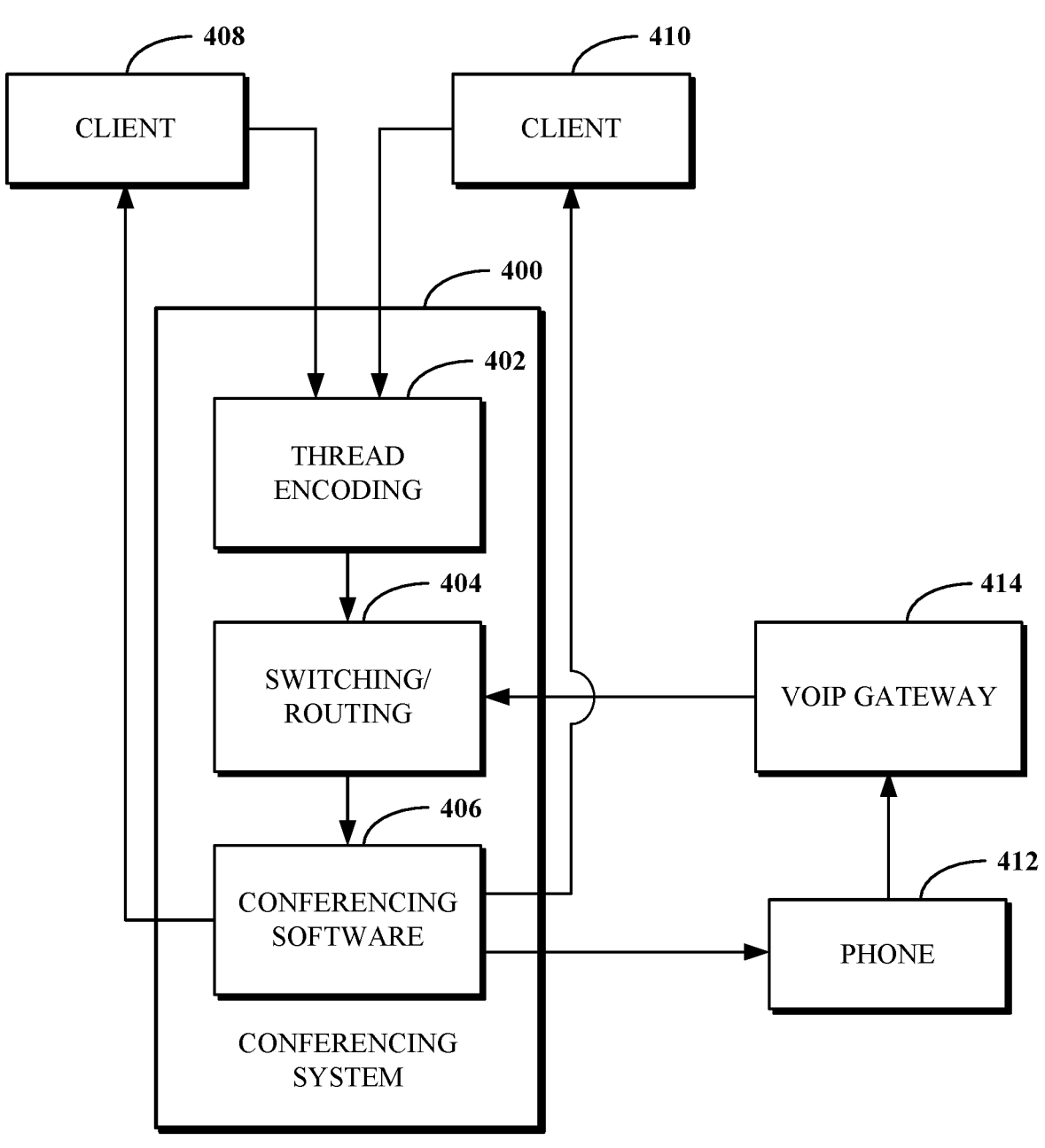
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may be, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other quantities of clients and/or other quantities of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A "user interface tile" as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and/or arranged in a center position of the conferencing software user interface while the user interface tiles for other conference participants are reduced in size and/or arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant accesses the conferencing software 406 from a phone, such as the phone 412, the user interface tile for the participant may be limited to a static image showing text (e.g., a name, telephone number, or other identifier associated with the participant or the phone 412) or other default background aspects since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining via clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
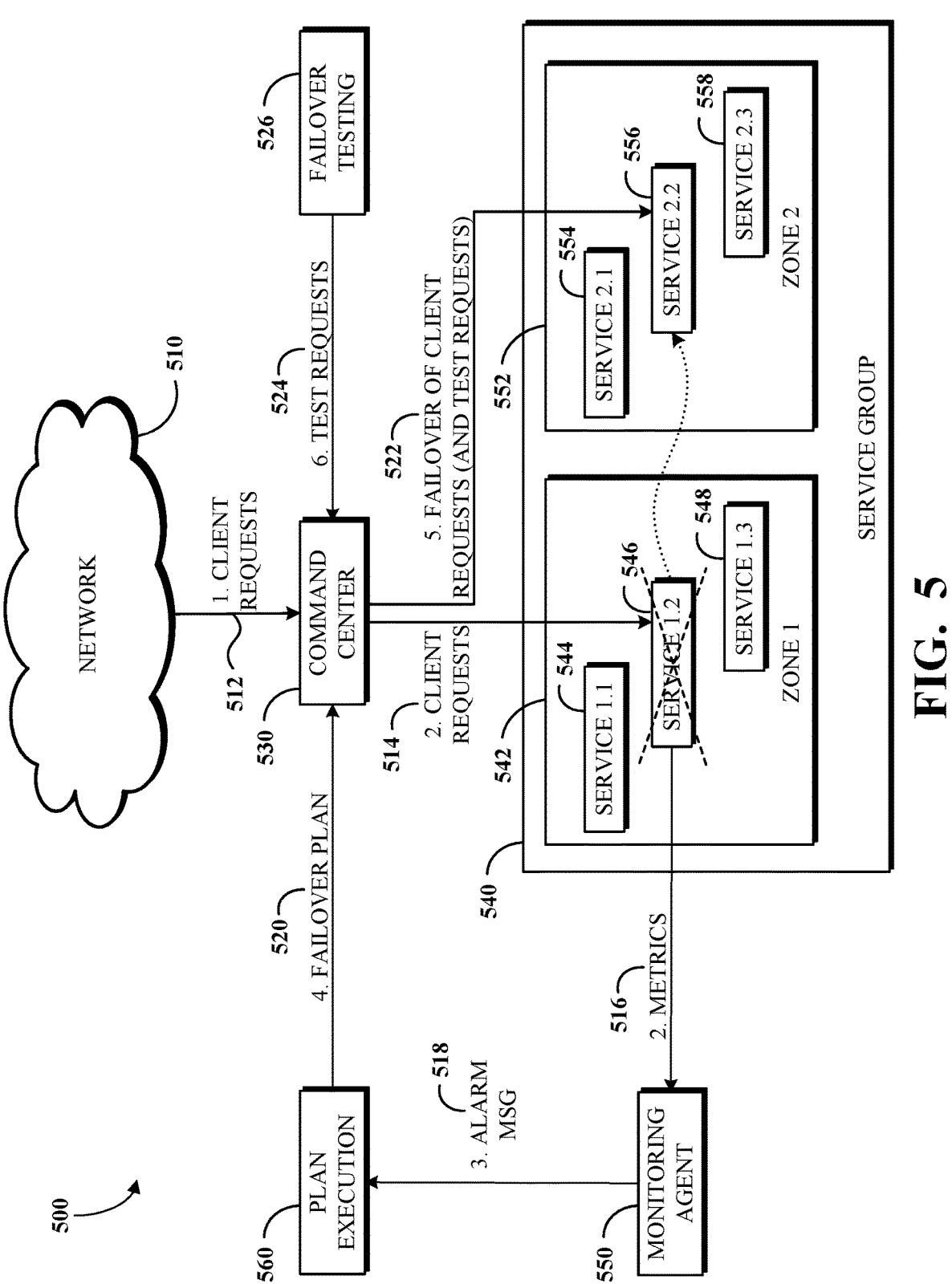
FIG. 5 is a block diagram of an example of a failover system for cloud-native applications.

FIG. 5 is a block diagram of an example of a failover system 500 for cloud-native applications. The cloud-native application may implement the conferencing system 400 of FIG. 4, for delivering conferencing software services in an electronic computing and communications system, for example, the system 100 shown in FIG. 1. The network 510 may be, for example, the network 114 of FIG. 1.

The cloud-native application may serve client requests 512 for services with the aid of a command center 530. The command center 530 is responsible for directing the client requests 512 to an appropriate computing device capable of serving the client requests 512. The computing device may be, for example, computing device 200 of FIG. 2, or the computing device may be, for example, the application server 108, the database server 110, or the telephony server 112 of FIG. 1. Hereafter the computing device will be referred to as a server. Examples of services for video conferencing that may be requested by a client may include live chat, whiteboard, user authentication, live-session recording, video-resolution configurability, and so on.

The services of a cloud-native application may be organized by geographic region and by similarity or redundancy. In FIG. 5, a zone 542 represents a physical geographic region that includes servers capable of serving client requests 512 for services 544, 546, and 548. Similarly, a zone 552 represents a physical geographic region that includes servers capable of serving client requests 512 for respective redundant services 554, 556, and 558. Such redundant services and/or redundant zones may be logically grouped into a service group 540.

Since different servers in different zones of the service group 540 may implement the same services, the command center 530 may determine to which server(s) and/or zone to direct an incoming client request 512. In one example, the command center 530 may each direct incoming client request 512 to a geographically nearest appropriate server and/or zone as an outgoing client request 514. Geographic proximity, load balancing, and request priority are some examples of ways for the command center 530 to determine how to direct outgoing client requests 514. However, a service may not always be available, for example if the server that implements the service has a hardware or software malfunction. Thus, the command center 530 should be able to redirect outgoing client requests to a different server capable of serving the request. This may be referred to as failover, and is described in more detail below.

Each service may be associated with a monitoring agent 550, that is configured to monitor, or measure, predefined metrics 516 of the service. Example metrics 516 may include heartbeat signals sent from the service, a quantity or ratio of unfulfilled service requests of the service, and so on. One monitoring agent 550 may monitor metrics 516 of one service, e.g., service 546, or multiple services, e.g., service 544, 546, and 548. The monitoring agent 550 may be implemented in one or more servers that also implement one or more monitored services, or it may be implemented in one or more dedicated servers. The monitoring agent 550 may be implemented by the other software 318 of FIG. 3.

Based on the monitored metrics 516, which may indicate an error condition of a service, the monitoring agent 550 determines whether to send an alarm message 518 to a plan-execution system 560. As an example, the monitoring agent 550 may send an alarm message 518 when the service 546 has sent fewer than a predefined quantity of heartbeat signals within a predefined duration, e.g., the service 546 is configured to send one heartbeat signal per minute but it has only sent three heartbeat signals in the last ten minutes. As another example, the monitoring agent 550 may send an alarm message 518 when the service 546 has failed to successfully serve a predefined quantity of client requests 514 within a predefined duration (e.g., a predefined rate), for example, the service 546 is configured to serve requests for a live chat during a live session of a video conference but it has failed to serve 20% of the live-chat requests within the last five minutes. In some implementations, the alarm message 518 indicates information about the error condition, for example, measurement data of a metric 516. In some implementations, the predefined duration may be infinite, meaning there is no time restriction on the respective condition (notwithstanding a system reset, for example). As another example, the monitoring agent 550 may send an alarm message 518 when an average response time of the service 546 for serving client requests 514 is greater than a predefined threshold, for example, the average response time of the service 546 exceeds 20 seconds. A response time may be considered a delay from when a client request 514 is received by the service 546 to when the service 546 sends a response to the client request 546.

The plan-execution system 560 is configured to implement predefined failover plans 520 according to a set of predefined rules. The plan-execution system 560 may be implemented by a computing device such as the computing device 200 of FIG. 2 or by the application server 108, the database server 110, or the telephony server 112 of FIG. 1. The plan-execution system 560 may be implemented by software, such as the other software 318 of FIG. 3. In some implementations, a failover plan 520 can be triggered by (e.g., determined by and sent according to) alarm messages 518 that indicate only one type of error condition, e.g., a subthreshold heartbeat error condition or a failure to adequately serve client requests 514. In some implementations, a failover plan 520 must be triggered by alarm messages 518 that indicate more than one type of error condition, e.g., the plan-execution system 560 must receive alarm messages 518 indicating a subthreshold heartbeat error condition and alarm messages 518 indicating a failure to adequately serve client requests 514. In some implementations, a failover plan 520 can be triggered by a single alarm message 518, and in other implementations a failover plan 520 must be triggered by multiple alarm messages 518 indicating the same or similar error condition(s) received within a predefined duration. For example, let alarm messages A, B, and C indicate error conditions A, B, and C, and let there be predefined failover plans X and Y. Failover plan X may be triggered by receipt of three alarm messages A within 200 seconds, and failover plan Y may be triggered by receipt of alarm message B and alarm message C within 30 seconds. Failover plans 520 can be triggered by Boolean combinations of alarm messages, e.g., using AND, OR, and NOT Boolean operations.

The plan-execution system 560 sends the failover plan 520 to the command center 530. The failover plan 520 indicates one or more actions to be taken by the command center 530, for example, the failover plan 520 may instruct the command center 530 to no longer direct incoming client requests 512 to a failing service, e.g., service 546 in the zone 542, as outgoing client requests 514, and to redirect such incoming client requests 512 to an equivalent service 556 in the different zone 552 as outgoing client requests 522. The failover plan 520 may therefore indicate to the command center 530 the failing service 546 and the failover (replacement) service 556. In implementations where, for example, all services 544, 546, and 548 are implemented on a same server, the failover for cloud-native applications described herein enables failover of an individual (failing) service 546 while continuing to direct client requests 512 to the other services 544 and 548. In other words, a failover can be at the service level, not the server level or the zone level.

The actions indicated by a failover plan 520 depend on the conditions that triggered the failover plan 520, e.g., a time-bound Boolean combination of one or more received alarm messages 518. For example, a failover plan 520 for implementing a failover of a non-critical error condition, for example, failing of a service 546 that serves client requests 512 for providing a library of virtual backgrounds for a client's live-session video stream, may differ from a failover plan 520 for implementing a failover of a critical error condition, for example, failing of a service 546 that serves client requests 512 for authenticating clients. In some implementations, for non-critical error conditions, the command center 530 may be instructed by the plan-execution system 560 to redirect some but not all client requests 512 for the failing service 546, e.g., to redirect a percentage of client requests 512 based on the severity and/or frequency of corresponding alarm messages 518. In some implementations, for critical error conditions, the command center 530 may be instructed by the plan-execution system 560 to redirect all client requests 512 for the failing service 546. Differences between failover plans 520 may be based on whether the failing service serves critical or non-critical services, real-time or non-real-time services, client-feature facing or back-end facing services, and so on. These designations are by example only, and a service that is deemed critical or non-critical, real-time or non-real-time, or client-feature facing or back-end facing in one implementation may be deemed differently in another implementation.

In some implementations, a failover-testing system 526 may test whether the failover plan 520 implemented by the plan-execution system 560 and carried out by the command center 530 has been successful. The failover-testing system 526 can generate and send test requests 524 that request the service of the failing (or failed) service 546. The failover-testing system 526, in cooperation with the monitoring agent 550, determine whether the command center 530 erroneously directs the test requests 524 to the failover service 546 or correctly directs the test requests 524 to the failover service 556. For example, a failover plan 520 for a failing service 546 may instruct the command center 530 to redirect 50% of all requests for the failing service 546 to the failover service 556. A monitoring agent 550 can monitor the quantity of client requests 514 received by the failing service 546 and another monitoring agent (not shown in FIG. 5) can monitor the quantity of client requests 522 received by the failover service 556. Both monitoring agents can communicate its respective measurement data to the failover testing system 526, which can determine whether each service 546 and 556 received approximately an equal number of requests.

Figure 7:
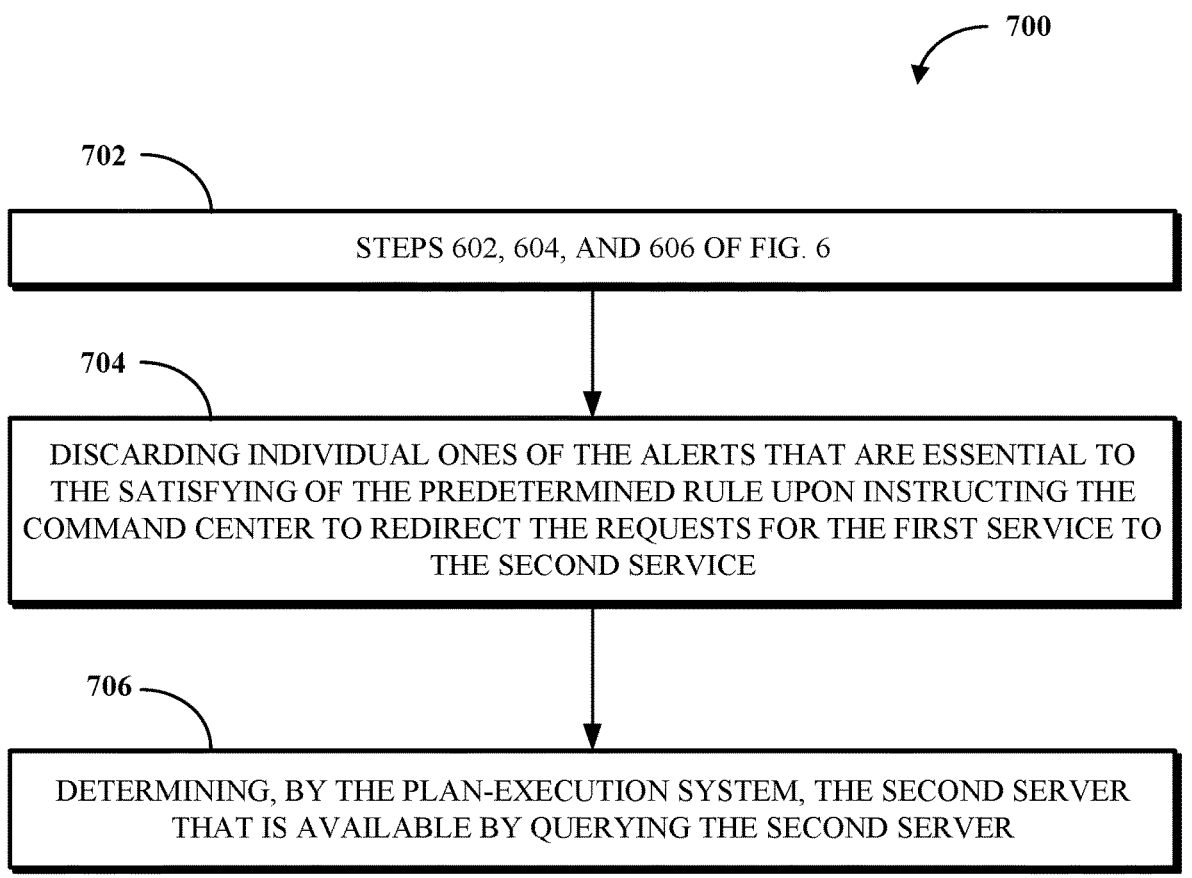
FIG. 7 is a flowchart of an example of a technique for failover for cloud-native applications.

To further describe some implementations in greater detail, reference is next made to examples of techniques which may be performed by or using a system for failover for cloud-native applications. FIG. 6 and FIG. 7 are respective flowcharts of example techniques for failover for cloud-native applications.

The techniques 600 and 700 can be executed using computing devices, such as the systems, hardware, and software described with respect to FIGS. 1-5. The techniques 600 and 700 can be performed, for example, by executing a machine-readable program or other computer-executable instructions, such as routines, instructions, programs, or other code. The steps, or operations, of the techniques 600 and 700, or another technique, method, process, or algorithm described in connection with the implementations disclosed herein can be implemented directly in hardware, firmware, software executed by hardware, circuitry, or a combination thereof.

For simplicity of explanation, the techniques 600 and 700 are depicted and described herein as a series of steps or operations. However, the steps or operations of the techniques 600 and 700 in accordance with this disclosure can occur in various orders and/or concurrently. Additionally, other steps or operations not presented and described herein may be used. Furthermore, not all illustrated steps or operations may be required to implement a technique in accordance with the disclosed subject matter. The techniques 600 and 700 may be performed by one or more components of a data center, for example, the monitoring agent 550, the plan-execution system 560, and the command center 530 of FIG. 5.

Referring first to FIG. 6, the step 602 comprises monitoring, by a software agent executing on a first server in a distributed client-server platform, one or more metrics of a first service executing on the first server, wherein requests for the first service are forwarded to the first server by a command center. The software agent may be the monitoring agent 550 of FIG. 5; the first server may be a server implementing the service 546 of FIG. 5; the command center may be the command center 530 of FIG. 5; and the client-server platform may be implemented by the software platform 300 implemented by the system 100 of FIG. 1. In some implementations, the one or more metrics may correspond to: a rate of successful or unsuccessful responses to requests received by the first service; an average response time of responses to requests received by the first service; or receiving heartbeat messages from the first service.

The step 604 comprises ascertaining, by a plan-execution system, alerts related to the one or more metrics and determining that the alerts satisfy a predefined rule. The plan-execution system may be the plan-execution system 560 of FIG. 5 and the alerts may be the alarm messages 518 of FIG. 5. In some implementations, ascertaining an individual one of the alerts comprises receiving a message from the software agent indicating that a monitored metric of the one or more metrics failed to satisfy a predefined threshold. In some implementations, ascertaining an individual one of the alerts comprises receiving heartbeat messages from the software agent at a rate that is less than a predefined threshold. In some implementations, the predefined rule corresponds to a Boolean combination of the one or more alerts.

The step 606 comprises, in response to the alerts satisfying the predefined rule, selecting, by the plan-execution system, an second server that is available and instructing the command center to redirect requests for the first service to a second service executing on the second server. The second server may be a server implementing the service 556 of FIG. 5. In some implementations, an individual one of the alerts is discarded after a predefined timeout. In some implementations, the predefined timeout may be configurable by an administrator.

Referring next to FIG. 7, the step 702 comprises performing the steps 602, 604, and 606 of FIG. 6.

The step 704 comprises discarding individual ones of the alerts that are essential to the satisfying of the predefined rule upon instructing the command center to redirect the requests for the first service to the second service. Such discarding prevents repeatedly instructing the command center to redirect the requests for the first service to the second service.

The step 706 comprises determining, by the plan-execution system, the second server that is available by sending a message to the second server requesting a response to the message from the second server. For example the message may be a simple ping message to determine whether the second server is responsive. In some implementations, the plan-execution system may send a message to the second server by sending a message to the second server requesting a status of the second server. For example, the message may request from the second serve an indication whether the second server has available capacity to serve additional client requests and/or an amount of available capacity to serve client requests.

Some implementations of the failover for cloud-native applications disclosed herein include a method, comprising: monitoring, by a software agent executing on a first server in a distributed client-server platform, one or more metrics of a first service executing on the first server, wherein requests for the first service are forwarded to the first server by a command center; ascertaining, by a plan-execution system, alerts related to the one or more metrics and determining whether the alerts satisfy a predefined rule; and in response to the alerts satisfying the predefined rule, selecting, by the plan-execution system, a second server that is available and instructing the command center to redirect requests for the first service to a second service executing on the second server.

In some implementations, the one or more metrics corresponds to: a rate of successful or unsuccessful responses to requests received by the first service.

In some implementations, the one or more metrics corresponds to: an average response time of responses to requests received by the first service.

In some implementations, the one or more metrics corresponds to: receiving heartbeat messages from the first service.

In some implementations, ascertaining an individual one of the alerts comprises: receiving a message from the software agent indicating that a monitored metric of the one or more metrics failed to satisfy a predefined threshold.

In some implementations, the predefined rule corresponds to: a Boolean combination of the one or more alerts.

In some implementations, an individual one of the alerts is discarded after a predefined timeout.

In some implementations, the method further comprises: discarding individual ones of the alerts that are essential to the satisfying of the predefined rule upon instructing the command center to redirect the requests for the first service to the second service.

In some implementations, the method further comprises: determining, by the plan-execution system, the second server that is available by sending a message to the second server requesting a response to the message from the second server.

In some implementations, the method further comprises: generating test requests for the first service from simulated clients; sending the test requests to the command center; and determining a quantity of the test requests that were redirected to the second service.

In some implementations, the distributed client-server platform comprises a video-conferencing platform.

Some implementations of the failover for cloud-native applications disclosed herein include a non-transitory computer-readable medium storing instructions operable to cause one or more processors to perform operations comprising: monitoring, by a software agent executing on a first server in a distributed client-server platform, one or more metrics of a first service executing on the first server, wherein requests for the first service are forwarded to the first server by a command center; ascertaining, by a plan-execution system, alerts related to the one or more metrics and determining whether the alerts satisfy a predefined rule; and in response to the alerts satisfying the predefined rule, selecting, by the plan-execution system, a second server that is available and instructing the command center to redirect requests for the first service to a second service executing on the second server.

In some implementations, the operations further comprise: generating test requests for the first service from simulated clients; sending the test requests to the command center; and determining a quantity of the test requests that were redirected to the second service.

In some implementations, the one or more metrics corresponds to at least one of: a rate of successful or unsuccessful responses to requests received by the first service; an average response time of responses to requests received by the first service; or receiving heartbeat messages from the first service.

In some implementations, the instructing of the command center to redirect requests for the first service comprises: instructing the command center to redirect fewer than all of the requests to the second service.

Some implementations of the failover for cloud-native applications disclosed herein include a system, comprising: one or more memories; and one or more processors configured to execute instructions stored in the one or more memories to: monitor, by a software agent executing on a first server in a distributed client-server platform, one or more metrics of a first service executing on the first server, wherein requests for the first service are forwarded to the first server by a command center; ascertain, by a plan-execution system, alerts related to the one or more metrics and determining whether the alerts satisfy a predefined rule; and in response to the alerts satisfying the predefined rule, select, by the plan-execution system, a second server that is available and instructs the command center to redirect requests for the first service to a second service executing on the second server.

In some implementations, the instructions include instructions to: generate test requests for the first service from simulated clients; send the test requests to the command center; and determine a quantity of the test requests that were redirected to the second service.

In some implementations, the instructions include instructions to: determine whether the alerts satisfy a predefined rule by determining whether each of a predefined quantity of the alerts ascertained within a predefined duration concerns a same metric that indicates a same error condition.

In some implementations, the instructions include instructions to: determine whether the alerts satisfy a predefined rule by determining whether each of a first predefined quantity of the alerts ascertained within a predefined duration concerns a same first metric that indicates a same first error condition and each of a second predefined quantity of the alerts ascertained within a second predefined duration concerns a same second metric that indicates a same second error condition.

In some implementations, the instructions include instructions to: determine, by the plan-execution system, the second server that is available by sending a message to the second server requesting a status of the second server.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

monitoring, by a software agent executing on a first server in a distributed client-server platform, one or more metrics of a first service executing on the first server, wherein requests for the first service are forwarded to the first server by a command center;

ascertaining, by a plan-execution system, alerts related to the one or more metrics and determining whether the alerts satisfy a predefined rule; and in response to the alerts satisfying the predefined rule, selecting, by the plan-execution system, a second server that is available and instructing the command center to redirect requests for the first service to a second service executing on the second server.

2. The method of claim 1, wherein the one or more metrics corresponds to:

a rate of successful or unsuccessful responses to requests received by the first service.

3. The method of claim 1, wherein the one or more metrics corresponds to:

an average response time of responses to requests received by the first service.

4. The method of claim 1, wherein the one or more metrics corresponds to:

receiving heartbeat messages from the first service.

5. The method of claim 1, wherein ascertaining an individual one of the alerts comprises:

receiving a message from the software agent indicating that a monitored metric of the one or more metrics failed to satisfy a predefined threshold.

6. The method of claim 1, wherein the predefined rule corresponds to:

a Boolean combination of the one or more alerts.

7. The method of claim 1, wherein:

an individual one of the alerts is discarded after a predefined timeout.

8. The method of claim 1, further comprising:

discarding individual ones of the alerts that are essential to the satisfying of the predefined rule upon instructing the command center to redirect the requests for the first service to the second service.

9. The method of claim 1, further comprising:

determining, by the plan-execution system, the second server that is available by sending a message to the second server requesting a response to the message from the second server.

10. The method of claim 1, further comprising:

generating test requests for the first service from simulated clients;

sending the test requests to the command center; and determining a quantity of the test requests that were redirected to the second service.

11. The method of claim 1, wherein:

the distributed client-server platform comprises a video-conferencing platform.

12. A non-transitory computer-readable medium storing instructions operable to cause one or more processors to perform operations comprising:

monitoring, by a software agent executing on a first server in a distributed client-server platform, one or more metrics of a first service executing on the first server, wherein requests for the first service are forwarded to the first server by a command center;

ascertaining, by a plan-execution system, alerts related to the one or more metrics and determining whether the alerts satisfy a predefined rule; and in response to the alerts satisfying the predefined rule, selecting, by the plan-execution system, a second server that is available and instructing the command center to redirect requests for the first service to a second service executing on the second server.

13. The medium of claim 12, wherein the operations further comprise:

generating test requests for the first service from simulated clients;

sending the test requests to the command center; and determining a quantity of the test requests that were redirected to the second service.

14. The medium of claim 12, wherein the one or more metrics correspond to at least one of:

a rate of successful or unsuccessful responses to requests received by the first service;

an average response time of responses to requests received by the first service; or receiving heartbeat messages from the first service.

15. The medium of claim 12, wherein the instructing of the command center to redirect requests for the first service comprises:

instructing the command center to redirect fewer than all of the requests to the second service.

16. A system, comprising:

one or more memories; and one or more processors configured to execute instructions stored in the one or more memories to:

monitor, by a software agent executing on a first server in a distributed client-server platform, one or more metrics of a first service executing on the first server, wherein requests for the first service are forwarded to the first server by a command center;

ascertain, by a plan-execution system, alerts related to the one or more metrics and determine whether the alerts satisfy a predefined rule; and in response to the alerts satisfying the predefined rule, select, by the plan-execution system, a second server that is available and instruct the command center to redirect requests for the first service to a second service executing on the second server.

17. The system of claim 16, wherein the instructions include instructions to:

generate test requests for the first service from simulated clients;

send the test requests to the command center; and determine a quantity of the test requests that were redirected to the second service.

18. The system of claim 16, wherein the instructions include instructions to:

determine whether the alerts satisfy a predefined rule by determining whether each of a predefined quantity of the alerts ascertained within a predefined duration concerns a same metric that indicates a same error condition.

19. The system of claim 16, wherein the instructions include instructions to:

determine whether the alerts satisfy a predefined rule by determining whether each of a first predefined quantity of the alerts ascertained within a predefined duration concerns a same first metric that indicates a same first error condition and each of a second predefined quantity of the alerts ascertained within a second predefined duration concerns a same second metric that indicates a same second error condition.

20. The system of claim 16, wherein the instructions include instructions to:

determine, by the plan-execution system, the second server that is available by sending a message to the second server requesting a status of the second server.

\* \* \* \* \*